(12) United States Patent
Link, II et al.

(10) Patent No.: US 9,395,186 B2
(45) Date of Patent: Jul. 19, 2016

(54) METHODS SYSTEMS, AND APPARATUSES FOR TELEMATICS NAVIGATION

(71) Applicant: HUGHES TELEMATICS, INC., Atlanta, GA (US)

(72) Inventors: Charles M. Link, II, Atlanta, GA (US); Kevin W Link, Atlanta, GA (US); Paul Kirsch, Cologne (DE); Marc Gordan, Atlanta, GA (US)

(73) Assignee: VERIZON TELEMATICS INC., Atlanta, GA (US)

( * ) Notice: Subject to any disclaimer, the term of this patent is extended or adjusted under 35 U.S.C. 154(b) by 0 days.

(21) Appl. No.: 13/711,578

(22) Filed: Dec. 11, 2012

(65) Prior Publication Data

US 2013/0116882 A1      May 9, 2013

Related U.S. Application Data

(63) Continuation of application No. 12/115,296, filed on May 5, 2008, now Pat. No. 8,355,870.

(51) Int. Cl.
  *G01C 21/00*    (2006.01)
  *G01C 21/34*    (2006.01)
  *G06F 17/30*    (2006.01)

(52) U.S. Cl.
  CPC ............ *G01C 21/00* (2013.01); *G01C 21/3446* (2013.01); *G06F 17/3087* (2013.01)

(58) Field of Classification Search
  CPC . G01C 21/3446; G01C 21/00; G06F 17/3087
  USPC ............ 701/400, 465, 527, 533; 370/995.27;
      340/905, 933, 995.21, 995.22, 995.23,
      340/995.24, 995.25, 995.26, 995.27
  See application file for complete search history.

(56) References Cited

U.S. PATENT DOCUMENTS

| | | | |
|---|---|---|---|
| 6,292,743 B1 * | 9/2001 | Pu et al. ......................... | 701/423 |
| 6,314,369 B1 * | 11/2001 | Ito et al. ......................... | 701/421 |
| 6,421,602 B1 * | 7/2002 | Bullock et al. ................ | 701/421 |
| 6,490,519 B1 | 12/2002 | Lapidot et al. | |
| 6,741,931 B1 | 5/2004 | Kohut et al. | |
| 6,807,483 B1 | 10/2004 | Chao et al. | |
| 7,099,772 B2 | 8/2006 | Hayot et al. | |
| 7,606,662 B2 | 10/2009 | Tengler et al. | |
| 7,710,421 B2 | 5/2010 | Muramatsu | |
| 8,019,581 B2 | 9/2011 | Sneha et al. | |
| 2002/0087262 A1 * | 7/2002 | Bullock et al. ................ | 701/202 |
| 2002/0165663 A1 | 11/2002 | Umezu et al. | |
| 2003/0220735 A1 | 11/2003 | Nimura | |
| 2004/0167711 A1 * | 8/2004 | Chen et al. ..................... | 701/209 |
| 2005/0222760 A1 * | 10/2005 | Cabral et al. .................. | 701/209 |
| 2005/0273250 A1 * | 12/2005 | Hamilton ........... | G01C 21/3492 701/532 |
| 2005/0288856 A1 * | 12/2005 | Uyeki et al. ................... | 701/210 |
| 2006/0031007 A1 * | 2/2006 | Agnew et al. .................. | 701/204 |
| 2006/0080029 A1 * | 4/2006 | Kodani et al. ................. | 701/208 |
| 2006/0116816 A1 * | 6/2006 | Chao et al. ..................... | 701/210 |
| 2006/0122768 A1 | 6/2006 | Sumizawa et al. | |

(Continued)

OTHER PUBLICATIONS

Li et al., "A Proposed Intelligent Vehicle Telematics Service System (IVTS)," IEEE 6th International Conference on ITS Telecommunications Proceedings, Jun. 2006, pp. 866-869.

*Primary Examiner* — Jaime Figueroa

(57) ABSTRACT

Provided are methods, systems, and apparatuses for telematics navigation.

19 Claims, 15 Drawing Sheets

(56) References Cited

U.S. PATENT DOCUMENTS

| | | | |
|---|---|---|---|
| 2006/0184315 A1* | 8/2006 | Liu et al. | 701/202 |
| 2006/0291633 A1* | 12/2006 | Glaza et al. | 379/112.02 |
| 2007/0005239 A1* | 1/2007 | Kirouchenaradje et al. | 701/209 |
| 2007/0083326 A1* | 4/2007 | Johnson et al. | 701/209 |
| 2007/0109303 A1 | 5/2007 | Muramatsu | |
| 2007/0155404 A1* | 7/2007 | Yamane et al. | 455/456.1 |
| 2007/0208498 A1* | 9/2007 | Barker et al. | 701/117 |
| 2008/0027636 A1* | 1/2008 | Tengler | G01C 21/3484 701/425 |
| 2008/0059057 A1* | 3/2008 | Tengler et al. | 701/204 |
| 2009/0248758 A1 | 10/2009 | Sawai et al. | |
| 2010/0106397 A1 | 4/2010 | Van Essen | |

\* cited by examiner

METHODS SYSTEMS, AND APPARATUSES FOR TELEMATICS NAVIGATION

CROSS REFERENCE TO RELATED APPLICATION

This application is a continuation of and claims priority under, 35 U.S.C. §120 to U.S. patent application Ser. No. 12/115,296 entitled "Methods, systems, and apparatuses for telematics navigation", filed on May 5, 2008, which application is incorporated herein by reference in its entirety, and which claims priority to U.S. Provisional Application No. 60/927,433 filed May 3, 2007, herein incorporated by reference in its entirety, and to which this application claims priority under 35 U.S.C. 119(e).

SUMMARY

In one aspect, provided are methods, systems, and apparatuses for telematics navigation.

Additional advantages will be set forth in part in the description which follows or may be learned by practice. The advantages will be realized and attained by means of the elements, and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute apart of this specification, illustrate embodiments and together with the description, serve to explain the principles of the methods and systems.

DETAILED DESCRIPTION

Figure 1:
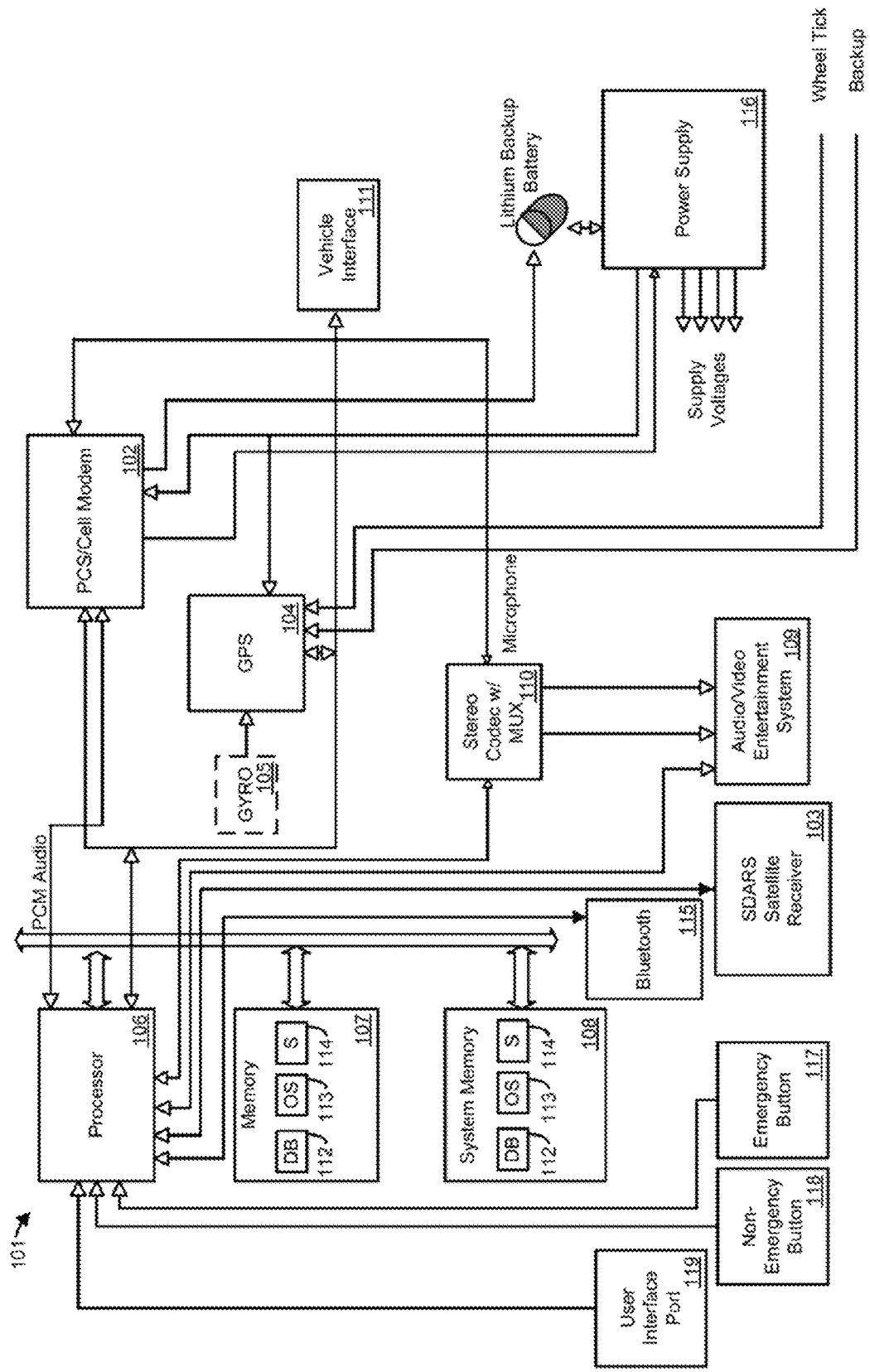
FIG. 1 is a schematic of an exemplary apparatus.

Before the present methods, systems, and apparatuses are disclosed and described, it is to be understood that the methods, systems, and apparatuses are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods, systems, and apparatuses may be understood more readily by reference to the following detailed description of preferred embodiments and the Examples included therein and to the Figures and their previous and following description.

Provided are methods, systems, and apparatuses that can utilize GPS capabilities and two-way in-vehicle data communications between an in car device and a telematics operations center. The methods, systems, and apparatuses enable various navigation solutions. The methods, systems, and apparatuses can comprise on-board navigation, off-board navigation, and/or a hybrid navigation approach. On-board navigation can comprise systems that store map data, location data, and can determine routing information in an apparatus installed in a vehicle or handheld. Off-board navigation can comprise systems wherein map data, location data, and routing determination capability is on a remote server and necessary map data, location data, and determined routes can be transmitted to an apparatus installed in a vehicle or handheld. A hybrid navigation system can comprise systems that store map and location data on an apparatus installed, in a vehicle or handheld, with updates to the map and location data provided by a remote server. In a hybrid navigation system, routing can be performed on the apparatus or at the remote server. Provided are methods of utilizing a telematics system and a navigation system, also referred to as a telematics navigation system.

In one aspect, provided is an apparatus comprising a telematics unit. The apparatus can be installed in a vehicle. Such vehicles include, but are not limited to, personal and commercial automobiles, motorcycles, transport vehicles, watercraft, aircraft, and the like. For example, an entire fleet of a vehicle manufacturer's vehicles can be equipped with the apparatus. The apparatus 101 is also referred, to herein as the VTU 101. The apparatus can perform any of the methods disclosed herein in part and/or in their entireties.

All components of the telematics unit can be contained within a single box and controlled with a single core processing subsystem or can be comprised of components distributed throughout a vehicle. Each of the components of the apparatus can be separate subsystems of the vehicle, for example, a communications component such as a SDARS, or other satellite receiver, can be coupled with an entertainment system of the vehicle.

An exemplary apparatus 161 is illustrated in FIG. 1. This exemplary apparatus is only an example of an apparatus and is not intended to suggest any limitation as to the scope of use or functionality of operating architecture. Neither should the apparatus be necessarily interpreted as having any dependency or requirement relating to any one or combination of components illustrated in the exemplary apparatus. The apparatus 101 can comprise one of more communications components. Apparatus 101 illustrates communications components (modules) PCS/Cell Modem 102 and SOARS receiver 103. These components can be referred to as vehicle mounted transceivers when located in a vehicle. PCS/Cell Modem 102 can operate on any frequency available in the country of operation, including, but not limited to, the 850/1900 MHz cellular and PCS frequency allocations. The type of communications can include, but is not limited to GPRS, EDGE, UMTS, 1xRTT or EV-DO. The PCS/Cell Modem 102 can be a Wi-Fi or mobile WIMAX implementation that can support operation on both licensed and unlicensed wireless frequencies. The apparatus 101 can comprise an SDARS receiver 103 or other satellite receiver. SDARS receiver 103 can utilize high powered satellites operating at, for example, 2.35 GHz to broadcast digital content to automobiles and some terrestrial receivers, generally demodulated for audio content, but can contain digital data streams.

PCS/Cell Modem 102 and SDARS receiver 103 can be used to update an onboard database 112 contained within the apparatus 101. Updating can be requested by the apparatus 101, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband implementation that provides a single data stream that is separated into useful and applicable components.

GPS receiver 104 can receive position information from a constellation of satellites operated by the U.S. Department of Defense. Alternately, the GPS receiver 104 can be a GLONASS receiver operated by the Russian Federation Ministry of Defense, or any other positioning device capable of providing accurate location information (for example, LORAN, inertial navigation, and the like). GPS receiver 104 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, the apparatus 101 can comprise a MEMS gyro 105 for measuring angular rates and wheel tick inputs for determining the exact position based on dead-reckoning techniques. This functionality is useful for determining accurate locations in metropolitan urban canyons, heavily tree-lined streets and tunnels.

In an aspect, the GPS receiver 104 can activate on ignition or start of motion. The GPS receiver 104 can go into idle on ignition off or after ten minutes without motion. Time to first fix can be <45 s 90% of the time. For example, this can be achieved either through chipset selection or periodic wake-up.

One or more processors 106 can control the various components of the apparatus 101. Processor 106 can be coupled to removable/non-removable, volatile/non-volatile computer storage media. By way of example, FIG. 1 illustrates memory 107, coupled to the processor 106, which can provide non-volatile storage of computer code, computer readable instructions, data structures, program modules, and other data for the computer 101. For example and not meant to be limiting, memory 107 can be a hard disk, a removable magnetic disk, a removable optical disk, magnetic cassettes or other magnetic storage devices, flash memory cards, CD-ROM, digital, versatile disks (DVD) or other optical storage, random access memories (RAM), read only memories (ROM), electrically erasable programmable read-only memory (EEPROM), and the like. Data obtained and/or determined by processor 106 can be displayed to a vehicle occupant and/or transmitted to a remote processing center. This transmission can occur over a wired or a wireless network. For example, the transmission, can utilize PCS/Cell Modem 102 to transmit the data. The data can be routed through the Internet where it can be accessed, displayed and manipulated.

The processing of the disclosed systems and methods can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored on the memory 107, including by way of example, an operating system 113 and reporting software 114. Each of the operating system 113 and reporting software 114 (or some combination thereof) can comprise elements of the programming and the reporting software 114. Data can also be stored on the memory 107 in database 112. Database 112 can be any of one or more databases known in the art. Examples of such databases comprise, DB2®, Microsoft® Access, Microsoft® SQL Server, Oracle®, mySQL PostgreSQL, and the like. The database 112 can be centralized or distributed across multiple systems.

In some aspects, data can be stored and transmitted in loss-less compressed form and the data can be tamper-proof. Non-limiting examples of data that can be collected are as follows. After a connection is established the protocol being used can be stored. A timestamp can be recorded on ignition for one or more trips. Speed every second during the trip. Crash events can be stored (for example, as approximated via OBD II speed). By way of example, GPS related data that can be recorded during one or more trips can comprise one or more of time, latitude, longitude, altitude, speed, heading, horizontal dilution of precision (HDOP), number of satellites locked, and the like. In one aspect, recorded data can be transmitted from the apparatus to a back-office for integrity verification and then via, for example, a cellular network. Once validated, data can be pushed to a company via established web-services & protocols.

By way of example, the operating system 113 can be a Linux (Unix-like) operating system. One feature of Linux is that it includes a set of "C" programming language functions referred to as "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

It is recognized that such programs and components reside at various times in different storage components of the apparatus 101, and are executed by the processor 106 of the apparatus 101. An implementation of reporting software 114 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 1 illustrates system memory 108, coupled to the processor 106, which can comprise computer readable media in the form of volatile memory, such as random access memory (RAM, SDRAM, and the like), and/or non-volatile memory, such as read only memory (ROM). The system memory 108 typically contains data and/or program modules such as operating system 113 and reporting software 114 that are immediately accessible to and/or are presently operated on by the processor 106. The operating system 113 can comprise a specialized task dispatcher, slicing available bandwidth among the necessary tasks at hand, including communications management, position determination and management, entertainment radio management, SDARS data, demodulation and assessment, power control, and vehicle communications.

The processor 106 can control additional components within the apparatus 101 to allow for ease of integration into vehicle systems. The processor 106 can control power to the components within the apparatus 101, for example, shutting off GPS receiver 104 and SDARS receiver 103 when the vehicle is inactive, and alternately shutting off the PCS/Cell Modem 102 to conserve the vehicle battery when the vehicle is stationary for long periods of inactivity. The processor 106 can also control an audio/video entertainment subsystem 109 and comprise a stereo codec and multiplexer 110 for providing entertainment audio and video to the vehicle occupants, for providing wireless communications audio (PCS/Cell phone audio), speech recognition from the driver compartment for manipulating the SDARS receiver 103 and PCS/Cell Modem 102 phone dialing, and text to speech and pre-recorded audio for vehicle status annunciation.

The apparatus 101 can interface and monitor various vehicle systems and sensors to determine vehicle conditions. Apparatus 101 can interface with a vehicle through a vehicle interface 111. The vehicle interface 111 can include, but is not limited to, OBD (On Board Diagnostics) port, OBD-II port, CAN (Controller Area Network) port, and the like. A cable can be used to connect the vehicle interface 111 to a vehicle. Any type of cable capable of connecting to a vehicle diagnostics port can be used. In one aspect, an OBD II connector cable can be used that follows the J1962 trapezoidal connector specification, the J1939 or J1708 round connector specifications, and the like. A communication protocol such as, J1850 PWM, J1850 VPW, ISO9141-2, ISO4230-4, and the like can be used to collect data through the vehicle interface 111. The vehicle interface 111, allows the apparatus 101 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any data obtained from any discrete sensor that contributes to the operation, of the vehicle engine and drivetrain computer. Additionally CAN interfacing can eliminate individual dedicated inputs to determine brake usage, backup status, and it can allow reading of onboard sensors in certain vehicle stability control modules providing gyro outputs, steering wheel position, accelerometer forces and the like for determining driving characteristics. The apparatus 101 can interface directly with a vehicle subsystem or a sensor, such as an accelerometer, gyroscope, airbag deployment computer, and the like. Data obtained from, and processed data derived from, the various vehicle systems and sensors can be transmitted to a central monitoring station via the PCS/Cell Modem 102.

Communication with a vehicle driver can be through an infotainment (radio) head (not shown) or other display device (not shown). More than, one display device can be used. Examples of display devices include, but are not limited to, a monitor, an LCD (Liquid Crystal Display), a projector, and the like. Audio/video entertainment subsystem 109 can comprise a radio receiver, FM, AM, Satellite, Digital and the like. Audio/video entertainment subsystem 109 can comprise one or more media players. An example of a media player includes, but is not limited to, audio cassettes, compact discs, DVD's, Blu-ray, HD-DVDs, Mini-Discs, Hash memory, portable audio players, hard disks, game systems, and the like. Audio/video entertainment subsystem 109 can comprise a user interface for controlling various functions. The user interface can comprise buttons, dials, and/or switches. In certain embodiments, the user interface can comprise a display screen. The display screen can be a touch screen. The display screen can be used to provide information about the particular entertainment being delivered to an occupant, including, but not limited to Radio Data System (RDS) information, ID3 tag information, video, and various control functionality (such as next, previous, pause, etc. . . . ), websites, and the like. Audio/video entertainment subsystem 109 can utilize wired or wireless techniques to communicate to various consumer electronics including, but not limited to, cellular phones, laptops, PDAs, portable audio players (such as an iPod), and the like. Audio/video entertainment subsystem 109 can be controlled remotely through, for example, a wireless remote control, voice commands, and the like.

The methods, systems, and apparatuses provided can utilize a power management scheme ensuring that a consumer's car battery is not impaired under normal operating conditions. This can include battery backup support when the vehicle is off in order to support various wake-up and keep-alive tasks. All data collected subsequent to the last acknowledged download can be maintained in non-volatile memory until the apparatus is reconnected to an external power source. At that point, the apparatus can self re-initialize and resume normal operation. Specific battery chemistry can optimize life/charge cycles. The battery can be rechargeable. The battery can be user replaceable or non-user replaceable.

The apparatus 101 can receive power from power supply 114. The power supply can have many unique features necessary for correct operation within the automotive environment. One mode is to supple a small amount of power (typically less than 100 microamps) to at least one master controller that can control all the other power buses inside of the VTU 101. In an exemplary system, a low power low dropout linear regulator supplies this power to PCS/Cellular modem 102. This provides the static power to maintain internal functions so that it can await external user push-button inputs or await CAN activity via vehicle interface 111. Upon receipt of an external stimulus via either a manual push button or CAM activity, the processor contained within the PCS/Cellular modem 102 can control the power supply 114 to activate other functions within the VTU 101, such as GPS 104/GYRO 105, Processor 106/Memory 107 and 108, SDARS receiver 103, audio/video entertainment system 109, audio codec mux 110, and any other peripheral within the VTU 101 that does not require standby power.

In an exemplary system, there can be a plurality of power supply states. One state can be a state of full power and operation, selected when the vehicle is operating. Another state can be a full power relying on battery backup. It can be desirable to turn off the GPS and any other non-communication related subsystem while operating on the back-up batteries. Another state can be when the vehicle has been shut off recently, perhaps within the last 30 days, and the system maintains communications with a two-way wireless network for various auxiliary services like remote door unlocking and location determination messages. After the recent shut down period, it is desirable to conserve the vehicle battery by turning off almost all power except the absolute minimum in order to maintain system time of day clocks and other functions, waiting to be awakened on CAN activity. Additional power states are contemplated, such, as a low power wakeup to cheek for network messages, but these are nonessential features to the operation of the VTU.

Normal operation can comprise, for example, the PCS/Cellular modem 102 waiting for an emergency pushbutton key-press or CAN activity. Once either is detected, the PCS/Cellular modem 102 can awaken and enable the power supply 114 as required. Shutdown can be similar wherein a first level shutdown turns off everything, except the PCS/Cellular modem 102, for example. The PCS/Cellular modem 192 can maintain wireless network contact during this state of operation. The VTU 101 can operate normally in the state when the vehicle is turned off. If the vehicle is off for an extended period of time, perhaps over a vacation etc., the PCS/Cellular modem 102 can be dropped to a very low power state where it no longer maintains contact with the wireless network.

Additionally, in FIG. 1, subsystems can include a BlueTooth transceiver 115 that can be provided to interface with devices such as phones, headsets, music players, and telematics user interfaces. The apparatus can comprise one or more user inputs, such as emergency button 117 and non-emergency button 118. Emergency button 117 can be coupled to the processor 106. The emergency button 117 can be located in a vehicle cockpit and activated an occupant of the vehicle. Activation of the emergency button 117 can cause processor 106 to initiate a voice and data connection from the vehicle to a central monitoring station, also referred to as a remote call center. Data such as GPS location and occupant personal information can be transmitted to the call center. The voice connection permits two way voice communication between a vehicle occupant and a call center operator. The call center operator can have local emergency responders dispatched to the vehicle based on the data received. In another embodiment, the connections are made from the vehicle to an emergency responder center.

One or more non-emergency buttons 118 can be coupled to the processor 106. One or more non-emergency buttons 118 can be located in a vehicle cockpit and activated by an occupant of the vehicle. Activation of the one or more non-emergency buttons 118 can cause processor 106 to initiate a voice and data connection from the vehicle to a remote call center. Data such as GPS location and occupant personal information can be transmitted, to the call center. The voice connection penults two way voice communications between a vehicle occupant and a call center operator. The call center operator can provide location based services to the vehicle occupant based on the data received and the vehicle occupant's desires. For example, a button can provide a vehicle occupant, with a link to roadside assistance services such as towing, spare tire changing, refueling, and the like. In another embodiment, a button can provide a vehicle occupant with concierge-type services, such as local restaurants, their locations, and contact information; local service providers their locations, and contact information; travel related information such as flight and train schedules; and the like.

For any voice communication, made through the VTU 101, text-to-speech algorithms can be used so as to convey predetermined messages in addition to or in place of a vehicle occupant speaking. This allows for communication when the vehicle occupant is unable or unwilling to communicate vocally.

In as aspect apparatus 101 can be coupled to a telematics user interface located remote from the apparatus. For example, the telematics user interface can be located in the cockpit of a vehicle in view of vehicle occupants while the apparatus 101 is located under the dashboard, behind a kick panel, in the engine compartment, in the trunk, or generally out of sight of vehicle occupants.

Figure 2:
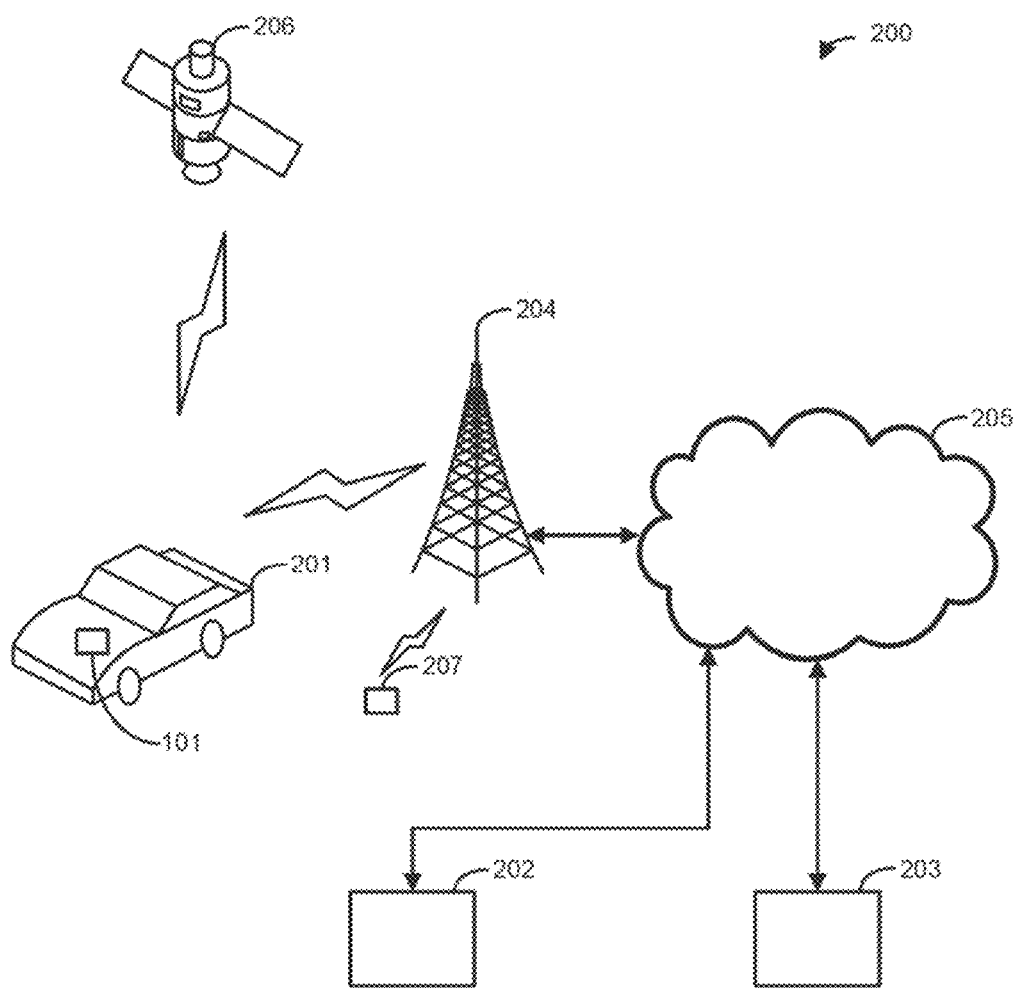
FIG. 2 is an exemplary system.

FIG. 2 is a block diagram illustrating an exemplary telematics navigation system 200 showing network connectivity between various components. The telematics navigation system 200 can comprise a VTU 101 located in a motor vehicle 201. The telematics navigation system 200 can comprise a mobile communication device 207. Mobile communication device can be a pager, a cellular phone, a PDA, a laptop, and the like. The telematics navigation system 200 can comprise a central monitoring station 202. The central monitoring station 202 can serve as a market specific data gatekeeper. That is, users 203 can pull information from specific, multiple or all markets at any given time for immediate analysis. The distributed computing model has no single point of complete system failure, thus minimizing telematics navigation system 200 downtime. In an embodiment, central monitoring station 202 can communicate through an existing communications network (e.g., wireless towers 204 and communications network 205) with the VTU 101 and the mobile communication device 207. In another embodiment, the VTU 101 can communicate directly with the mobile communication device 207. Telematics navigation system 200 can comprise at least one satellite 206 from which GPS data are determined. These signals can be received by a GPS receiver in the vehicle 201.

The telematics navigation, system 200 can comprise a plurality of users 203 (governments, corporations, individuals, and the like) which can access telematics navigation system 200 using a computer or other such computing device, running a commercially available Web browser or client software. For simplicity, FIG. 2 shows only one user 203. The users 203 can connect to the telematics navigation system 200 via the communications network 205. In an embodiment, communications network 205 can comprise the Internet.

The telematics navigation system 200 can comprise a central monitoring station 202 which can comprise one or more central monitoring station servers. In some aspects, one or more central monitoring station servers can serve as the "back-bone" (i.e., system processing) of the present telematics navigation system 200. One skilled in the art will appreciate that telematics navigation system 200 can utilize servers (and databases) physically located on one or more computers and at one or more locations. Central monitoring station server can comprise software code logic that is responsible for handling tasks such as route determination, traffic analysis, map data storage, location data storage, POI data storage, data interpretations, statistics processing, data preparation and compression for output to VTU 101, and interactive route planning, location and POI searching, and the like, for output to users 203. In an embodiment, user 203 can host a server (also referred to as a remote host) that can perform similar functions as a central monitoring station server. In an embodiment of the present telematics navigation system 200, central monitoring station servers and/or remote host servers, can have access to a repository database which can be a central store for a portion of or all information within the telematics navigation system 200 (e.g., executable code, map, location, POI information, subscriber information such, as login names, passwords, etc., and vehicle and demographics related data).

In an aspect, central monitoring station 202 can provide updates to the VTU 101 including, but not limited to, map updates, POI updates, routing software updates, and the like.

Central monitoring station servers and/or a remote host server can also provide a "front-end" for the telematics navigation system 200. That is, a central monitoring station server can comprise a Web server for providing a Web site which sends out Web pages in response to requests from remote browsers (i.e., users 203 or customers of users 203). More specifically, a central monitoring station server and/or a remote host server can provide a graphical user interface (GUI) "front-end" to users 203 of the telematics navigation system 200 in the form of Web pages. These Web pages, when sent to the user PC (or the like), can result in GUI screens being displayed.

Figure 3:
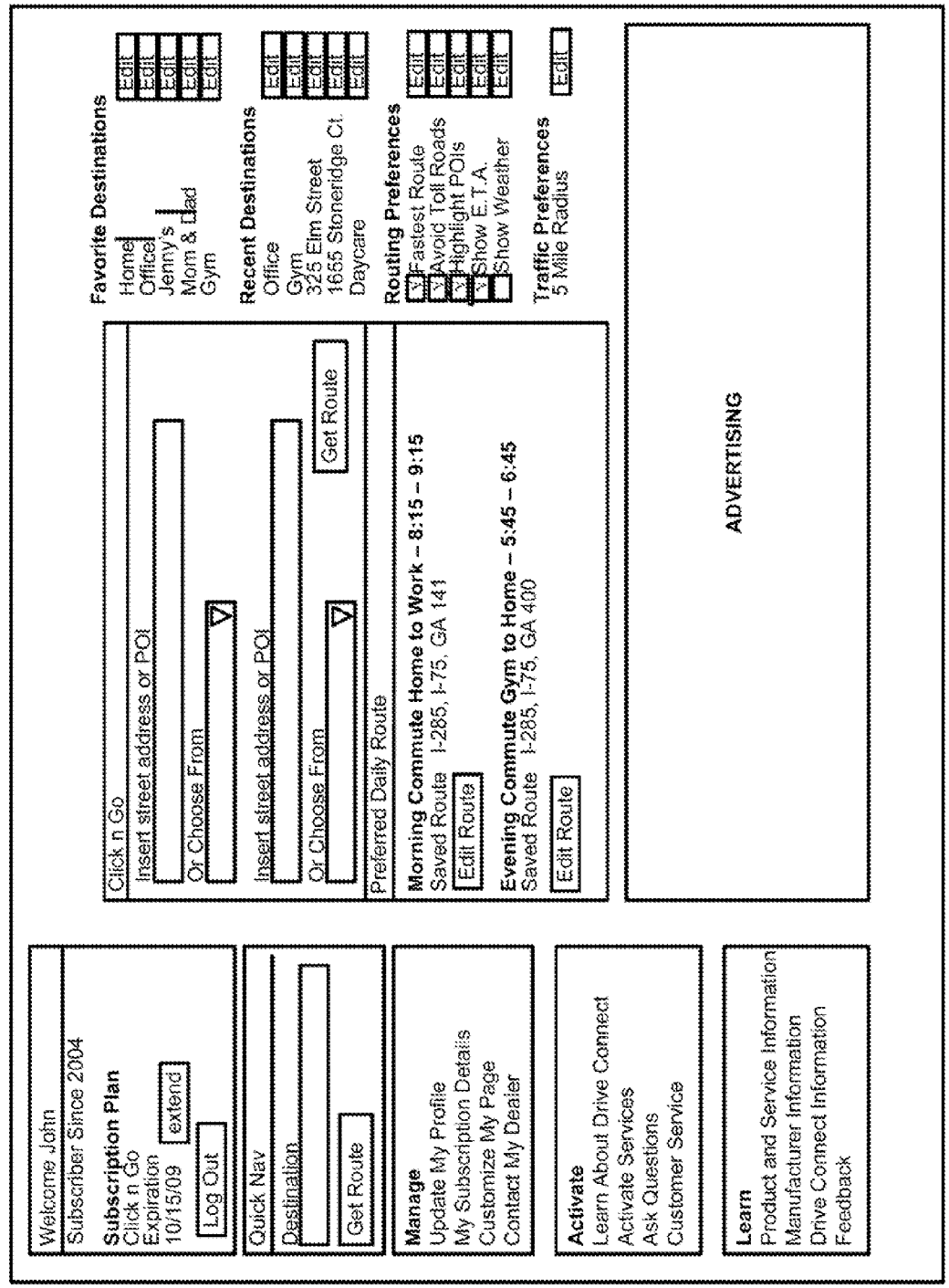
FIG. 3 is an exemplary user interface.

An exemplary web interface is illustrated in FIG. 3 that can supply navigation solutions to consumers in a useful and attractive format. Users/consumers can enter default locations, destinations, plan routes, edit routes, search for Points of interest (POIs), create POIs, set up preferred daily routes, check traffic, and the like, through the web-interface. In another embodiment, data can be input from a mobile communication device through interactive voice response (IVR), email Short Message Service (SMS) text message, and the like. In another embodiment, data can be input from an in-vehicle interface such as a touchscreen, headunit, IVR, keyboard, keypad, and the like. Any or all of the data input and/or generated by the features described herein including but not limited to, locations, routes, and the like can be uploaded to the internet, stored for display on a web-site, and/or sent to the vehicle owner (or other approved party) by any known method of communication.

In one aspect, an exemplary flow and operation of the telematics navigation system 200 can be as follows. A user 203 can log in to a website, such as the one depicted in FIG. 3. The user can utilize the website to enter and store destinations, such as favorite destinations, default destinations, and the like. The user can utilize the website to plan a route between two or more locations. In planning the route, the user can specify one or more routing preferences such as fastest route, avoid tolls, indicate POIs, show estimated time of arrival (ETA), show weather and the like. The user 203 can further specify traffic preferences, such as an area of interest for traffic. The VTU 101 can transmit to the central monitoring station 202 a history of locations that the vehicle 201 has been, either automatically or by user 203 request. The history of locations can be provided to the user 203 for use in route planning.

The user 203 can plan one or more routes between stored destinations, between newly entered destinations, or between a newly entered destination and a stored destination. Once a route has been generated, the user 203 can modify the route. If the user 203 is satisfied with the route, the user 203 can have data transmitted to the VTU 101. In an aspect, the user 203, does not have to plan a route to transmit data to the VTU 101. In an aspect, the user 203 can have one or more destinations transmitted, one or more routes transmitted, one or more points of interest transmitted, traffic data transmitted, weather data transmitted, and combinations thereof. A route can be determined at a server of the central monitoring station 202 and/or at the VTU 101.

In another aspect, a user can utilize a mobile communication device 207 to transmit destination information, POI information and the like to central monitoring station 202 through a wireless link to communications network 205. The transmission can be, for example, via voice, SMS, email, and the like. The central monitoring station 202 can receive the information, and transmit the information to the VTU 101. Additionally, the central monitoring station can determine routing information from the destination and/or POI information received from the mobile communication device 207 and transmit routing information to the VTU 101. In another aspect, a user can utilize a mobile communication device 207 to transmit destination information, POI information and the like directly to the VTU 101, for example, through an RF link, Bluetooth link, infrared link, wired link and the like. The VTU 101 can utilized the information to perform navigation functions, or the VTU 101 can relay the information to the central monitoring station 202.

In another aspect, a user can utilize an in-vehicle interface to transmit destination information, POI information and the like to central monitoring station 202 through a wireless link to communications network 205. The in-vehicle interface can be, for example, a touchscreen, a headunit, IVR, a keypad, a keyboard, and the like.

The central monitoring station 202, or similar host, can prepare the data for transmission as one or more packets. A packet can be sent through communications network 205 and ultimately via a wireless link to the VTU 101. There, the data can be stored and made available to a vehicle occupant. A vehicle occupant can access the data through, for example, a touchscreen, a headunit, an IVR system, a keypad, a keyboard and the like.

Figure 4:
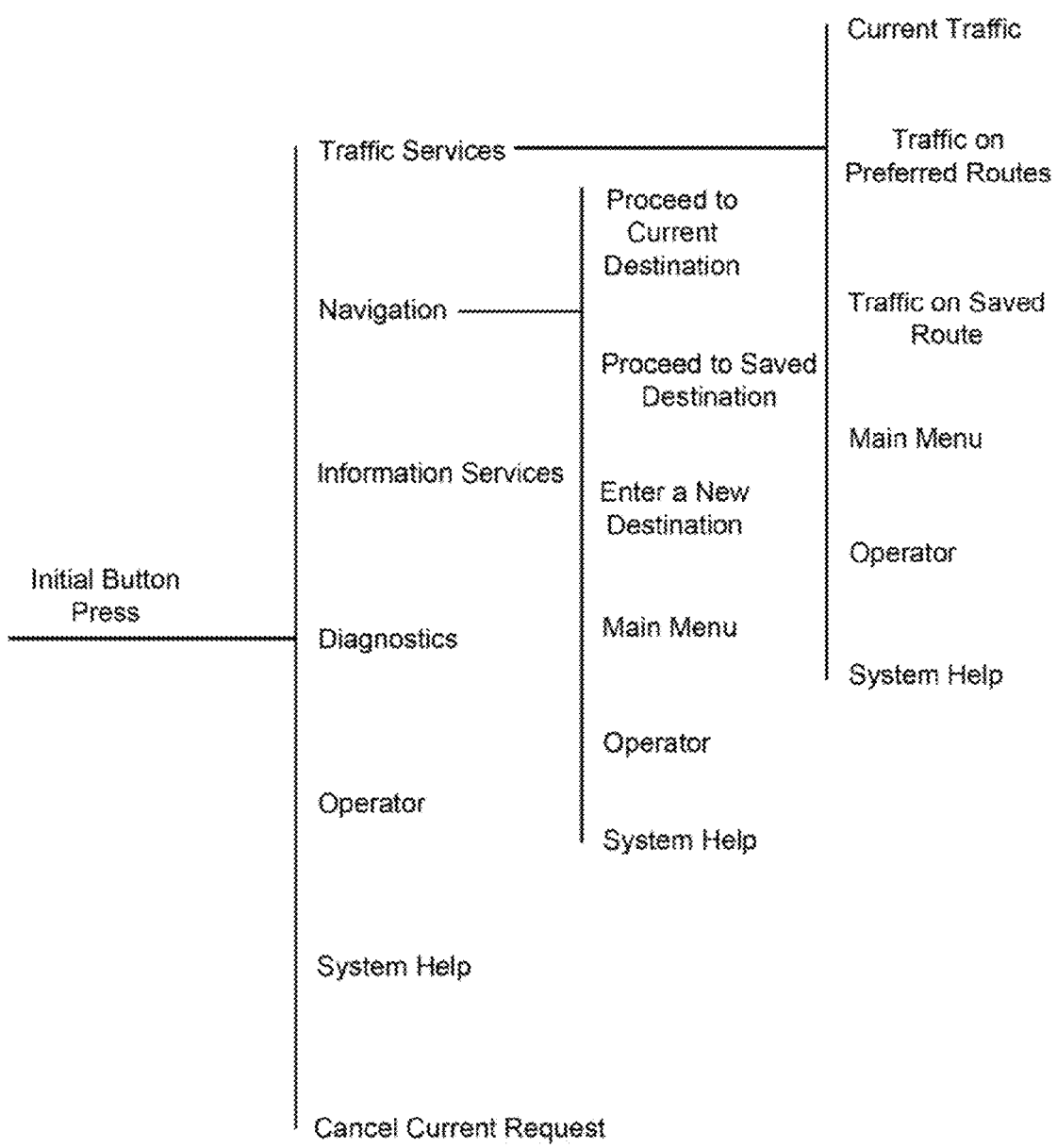
FIG. 4 is an process flow for a voice response menu system.

FIG. 4 illustrates an exemplary process 5low for accessing navigation, data stored on the VTU 101 through an IVR. A vehicle occupant can press a button to initiate the process. A prerecorded voice can provide the vehicle occupant with menu options. Upon hearing the desired menu option, the user can press the button again. For example, a vehicle occupant can opt to "Proceed to a Saved Destination". Upon receiving the selection, the system can provide the vehicle occupant a listing of saved destinations. After the vehicle occupant selects a saved destination, the system can determine the vehicle's current location and determine a route to the selected destination. The route can be determined on-board the VTU 101 or off-board at central monitoring station 202 or similar host. Similarly, a vehicle occupant can obtain traffic information from central monitoring station 202 or similar host.

In another aspect, the user 203 can establish a preferred daily route through the web site. The user 203 can setup a plurality of routes between two locations, a starting location, and a destination. For example, between Home and Work, between Work and Home, between Work and Gym, and between Gym and Home, and the like. Examples are shown in the interface of FIG. 3. The user 203 can further establish a timeframe within which the user 203 intends to initiate travel between two of the locations. When the vehicle 201 is started at one of the starting locations within the timeframe establish for the starting location, the system can determine which of the plurality of routes has the lowest ETA based one or more of a plurality of factors (i.e. the "preferred daily route"). The plurality of factors can include, but are not limited, to, traffic, construction, weather, and the like. The preferred daily route can be determined on-board by retrieving one or more of the plurality of factors from central monitoring station 202 or similar host. In another aspect, the preferred daily route can be determined off-board by central monitoring station 202 or similar host, and transmitted to the VTU 101.

As described above, VTU 101 can communicate with one or more computers, either through direct wireless communication and/or through, a network such, as the internet. Such communication can facilitate data transfer, voice communication, and the like. One skilled in the art will appreciate that what follows is a functional description of an exemplary computing device and that various functions can be performed by software, by hardware, or by any combination of software and hardware.

Figure 5:
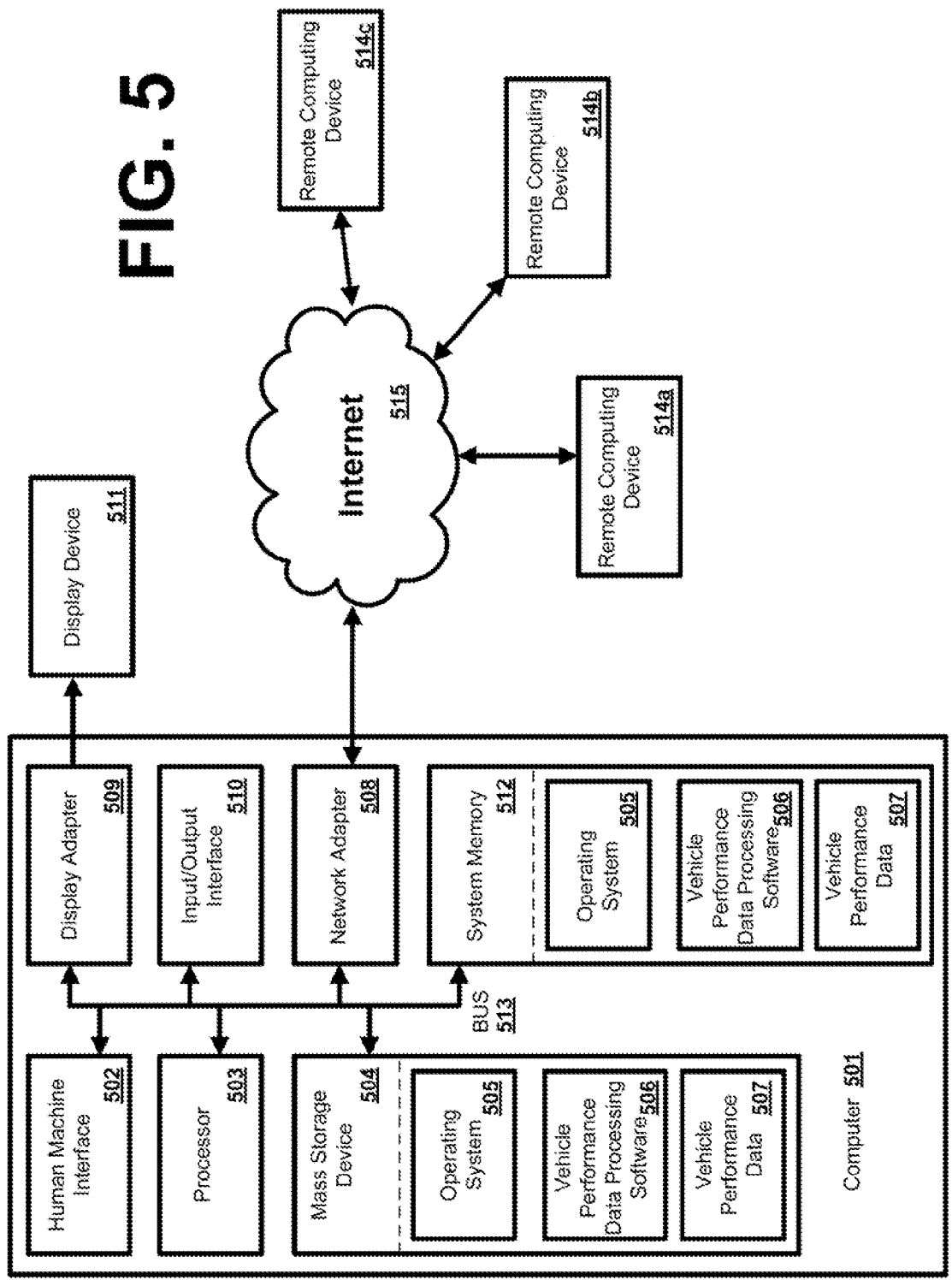
FIG. 5 is an exemplary operating environment for disclosed methods.

FIG. 5 is a block diagram illustrating an exemplary operating environment for performing the disclosed methods, for example, a server, or other computing device, at a remote host or a central monitoring station. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, PCI-Express bus. Universal Serial Bus (USB), and the like. The bus 513, and all buses specified in this description can also be implemented over a wired or wireless network connection and each of the subsystems, including the processor 503, a mass storage device 504, an operating system 505, navigation software 506, navigation data 507, a network adapter (or communications interface) 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system. In one aspect, a remote computing device can be a VTU 101.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as navigation data 507 and/or program modules such as operating system 505 and navigation software 506 that are immediately accessible to and/or are presently operated on by the processing unit 503. Navigation data 507 can comprise any data generated by, generated for, received from, or sent to the VTU 101.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and navigation software 506. Each of the operating system 505 and navigation software 506 (or some combination thereof) can comprise elements of the programming and the navigation software 506. Navigation data 507 can also be stored on the mass storage device 504. Navigation data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form, of visual representation, including, but not limited to, textual, graphical, animation, audio, tactile, and the like.

The computer 501 can operate in a networked environment using logical connections to one or more remote computing devices 514a,b,c. By way of example, a remote computing device can be a personal computer, portable computer, a server, a router, a network computer, a VTU 101, a PDA, a cellular phone, a "smart" phone, a wireless communications enabled key fob, a peer device or other common network node, and so on. Logical connections between the computer 501 and a remote computing device 514a,b,c can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and the Internet 515. In one aspect, the remote computing device 514a,b,c can be one or more VTU 101's.

For purposes of illustration, application programs and other executable program components such as the operating system 505 are illustrated herein as discrete blocks, although it is recognized that such programs and components reside at various times in different storage components of the computing device 501, and are executed by the data processors) of the computer. An implementation of navigation software 506 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

As used herein in the method descriptions that follow, in certain embodiments, "in-vehicle system" can comprise a system that is installed in a vehicle, either at a factory, dealer, or by the user. In other embodiments, "in-vehicle system" can comprise components and systems that can be used outside of a vehicle. In various embodiments, the in-vehicle system can comprise a telematics device, a navigation system, an infotainment system, combinations thereof, and the like. The "remote host" can be a central monitoring station, or other host that maintains computing and communications systems configured for carrying out the methods.

Figure 6:
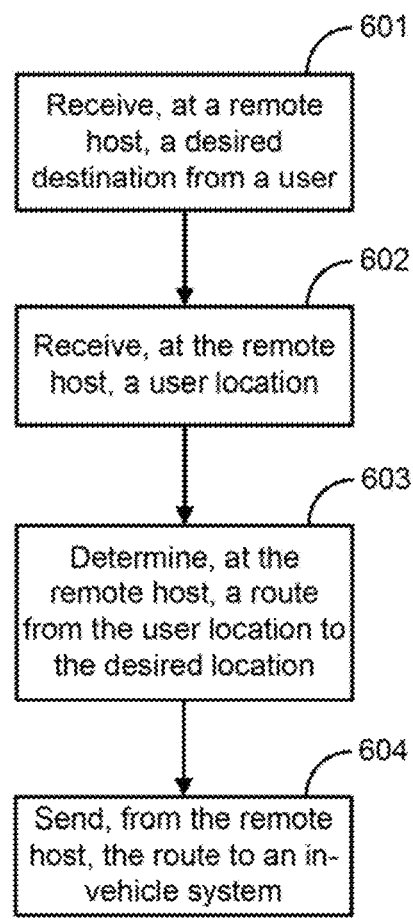
FIG. 6 is a flow diagram illustrating an exemplary method for telematics navigation.

In an aspect, illustrated in FIG. 6, provided are methods for navigation, comprising receiving, at a remote host, a desired destination from a user at 601, receiving, at the remote host, a user location at 602, determining, at the remote host, a route from the user location to the desired location at 603, and sending, from the remote host, the route to an in-vehicle system at 604. The methods can further comprise outputting a visual representation of the route to a display device.

Receiving, at a remote host, a desired destination from a user can comprise one or more of, receiving the desired destination through a website, through an SMS text message, through an email, or through an in-vehicle input device.

Determining, at the remote host, a route from the user location to the desired location further can comprise presenting the route to the user for editing. Determining, at the remote host, a route from the user location to the desired location further can comprise incorporating traffic data into the route determination.

Figure 7:
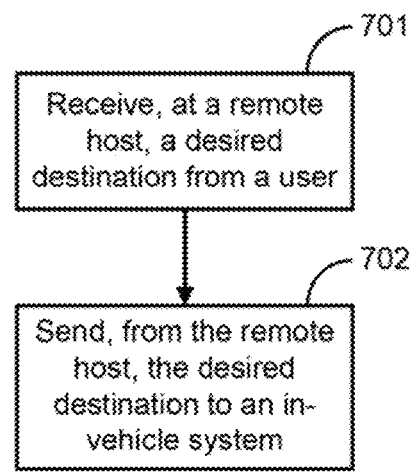
FIG. 7 is a flow diagram illustrating another exemplary method telematics navigation.

In another aspect, illustrated in FIG. 7, provided are methods for navigation, comprising receiving, at a remote host, a desired destination from a user at 701 and sending, from the remote host, the desired destination to an in-vehicle system at 702. The methods can further comprise outputting a visual representation of the desired destination to a display device.

Receiving, at a remote host, a desired destination from a user can comprise one or more of, receiving the desired destination through a website, through an SMS text message, through an email, or through an in-vehicle input device.

Sending, from the remote host, the desired destination to an in-vehicle system can comprise transmitting the desired destination over one or more of, a cellular network, an IP network, a satellite network. Sending, from the remote host, the desired destination to an in-vehicle system can comprise transmitting the desired destination through an SMS text message or through an email.

Figure 8:
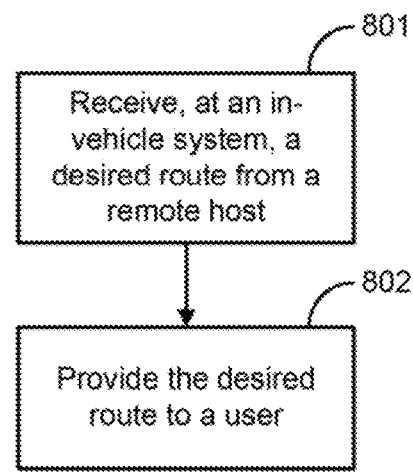
FIG. 8 is a flow diagram illustrating another exemplary method for telematics navigation.

In an aspect, illustrated in FIG. 8, provided are methods for navigation, comprising receiving, at an in-vehicle system, a desired route from a remote host at 801 and providing the desired, route to a user at 802.

Receiving, at an in-vehicle system, a desired route from a remote host can comprise one or more of, receiving the desired route through an SMS text message or through an email. Receiving, at an in-vehicle system, a desired route from a remote host can comprise receiving the desired route over one or more of, a cellular network, an IP network, a satellite network.

Providing the desired route to the user can comprise outputting a visual representation of the desired route to a display device. Providing the desired route to the user can comprise providing the desired route to the user in response to a user command.

Figure 9:
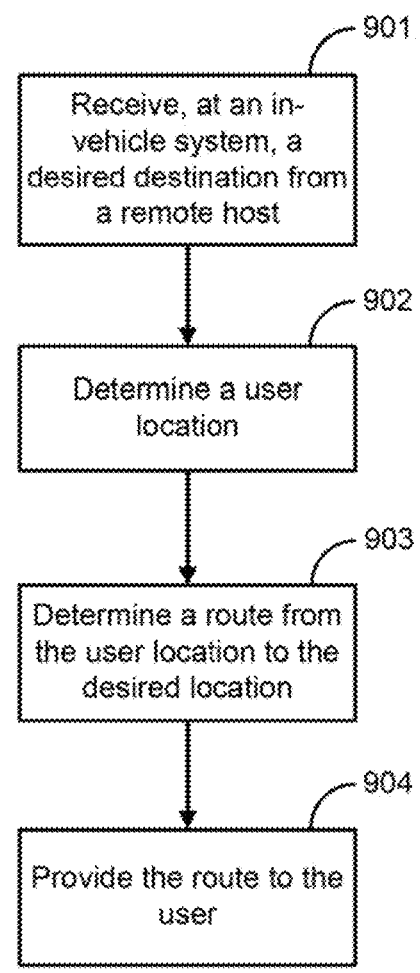
FIG. 9 is a flow diagram illustrating an exemplary method for telematics navigation.

In an aspect, illustrated in FIG. 9, provided are methods for navigation, comprising receiving, at an in-vehicle system, a desired destination from a remote host at 901, determining a user location at 902, determining a route from fee user location to the desired location at 903, and providing the route to the user at 904.

Receiving, at an in-vehicle system, a desired, destination from a remote host can comprise one or more of, receiving the desired destination through an SMS text message or through an email.

Receiving, at an in-vehicle system, a desired destination from a remote host can comprise receiving the desired, destination over one or more of, a cellular network, an IP network, a satellite network.

Determining a user location can comprise determining the user location with a GPS system. Providing the route to the user can comprise outputting a visual representation of the route to a display device. Providing the route to the user can comprise providing fee route to the user in response to a user command.

Figure 10:
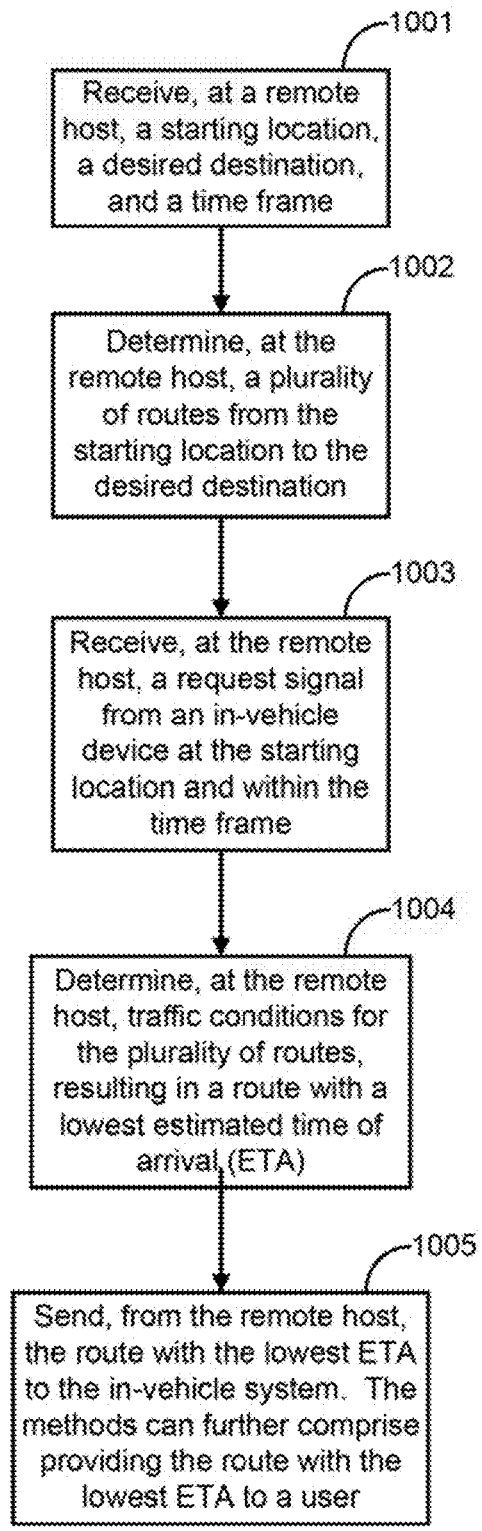
FIG. 10 is a flow diagram illustrating another exemplary method for telematics navigation.

In an aspect illustrated in FIG. 10, provided are methods for navigation, comprising receiving, at a remote host, a starting location, a desired destination, and a time frame at 1001, determining, at the remote host, a plurality of routes from the starting location to the desired destination at 1002, receiving, at the remote host, a request signal from an in-vehicle device at the starting location and within the time frame at 1003, determining, at the remote host, traffic conditions for the plurality of routes, resulting in a route with a lowest estimated time of arrival (ETA) at 1004, and sending, from the remote host, the route with the lowest ETA to the in-vehicle system. The methods can further comprise providing the route with the lowest ETA to a user at 1005.

The starting location can be a home location, the desired destination can be a work location, and the lime frame can be from about 7:00 AM to about 9:00 AM. The predetermined time frame can be any time frame, including but not limited to 5:00 AM to 6:00 AM, 6:00 AM to 7:00 AM, 5:00 AM to 8:00 AM, and the like.

Receiving, at the remote host, a starting location, a desired destination, and a time frame can comprise receiving the starting location, the desired destination, and the time frame through a website.

Determining, at the remote host, a plurality of routes from the starting location to the desired destination can comprise determining routes utilizing at least one different roadway.

Receiving, at the remote host, a request signal from an in-vehicle device at the starting location and within the time frame can comprise receiving the request signal from a vehicle telematics unit. Receiving, at the remote host, a request signal, from an in-vehicle device at the starting location and within, the time frame can compose receiving the request signal through an SMS text message or through an email.

Figure 11:
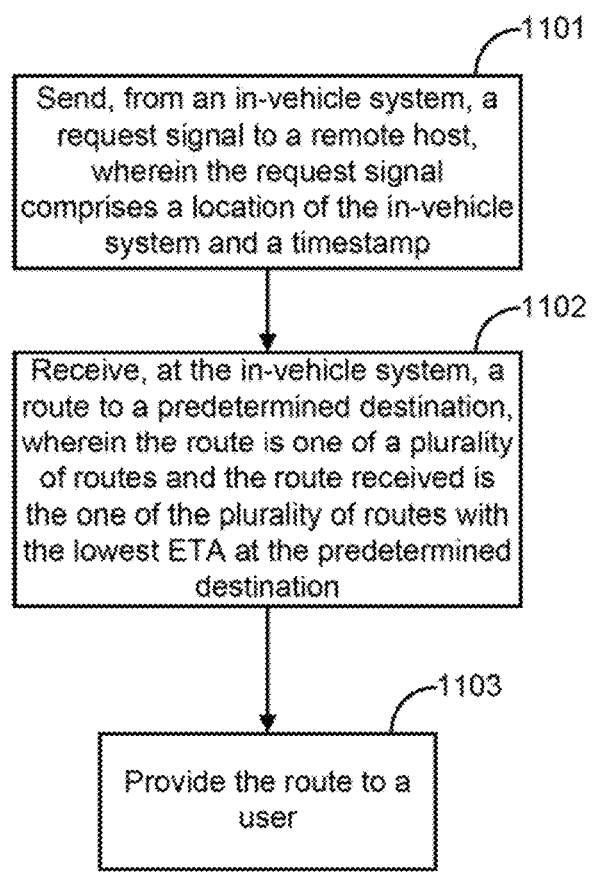
FIG. 11 is a flow diagram illustrating an exemplary method for telematics navigation.

In an aspect, illustrated in FIG. 11, provided are methods for navigation, comprising sending, from an in-vehicle system, a request signal, to a remote host, wherein the request signal composes a location of the in-vehicle system and a timestamp at 1101, receiving, at the in-vehicle system, a route to a predetermined destination, wherein the route is one of a plurality of routes and the route received is the one of the plurality of routes with the lowest ETA at the predetermined destination at 1102, and providing the route to a user at 1103.

The location can be a home location and the time stamp can be between a predetermined time frame. The predetermined time frame can be any time frame, including but not limited to 5:00 AM to 6:00 AM, 6:00 AM to 7:00 AM, 5:00 AM to 8:00 AM, and the like. Receiving, at the in-vehicle system, a route to a predetermined destination can comprise receiving the route over one or more of, a cellular network, an IP network, a satellite network. Receiving, at the in-vehicle system, a route to a predetermined destination can comprise receiving the route through an SMS text message or through an email. Providing the route to the user can comprise outputting a visual representation of the route to a display device.

Figure 12:
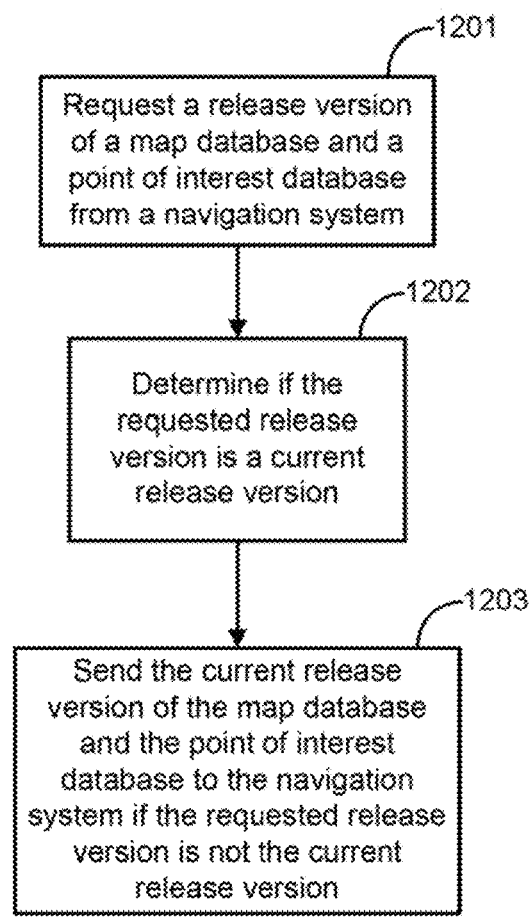
FIG. 12 is a flow diagram illustrating another exemplary method for telematics navigation.

In an aspect, illustrated in FIG. 12, provided are methods for navigation, comprising requesting a release version of a map database and a point of interest database from a navigation system at 1201, determining if the requested release version is a current release version at 1202, and sending the current release version of the map database and the point of interest database to the navigation system if the requested release version is not the current release version at 1203.

The methods can be performed automatically on a predetermined time period. For example, the predetermined time period can be every week, every month, every six months, every year, and the like. The navigation system can comprise an in-vehicle navigation system.

Sending the current release version of the map database and the point of interest database to the navigation system can comprise transmitting data that changed between, releases. Sending the current release version, of the map database and the point of interest database can comprise sending over one or more of, a cellular network, an IP network, a satellite network.

Requesting a release version of a map database and a point of interest database from a navigation system can comprise requesting over one or more of, a cellular network, an IP network, a satellite network.

Figure 13:
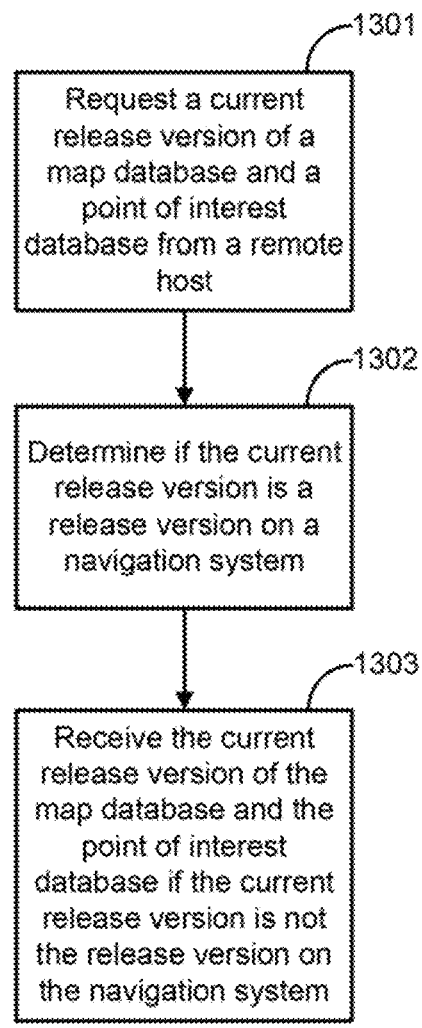
FIG. 13 is a flow diagram illustrating an exemplary method for telematics navigation.

In an aspect, illustrated in FIG. 13, provided are methods for navigation, comprising requesting a current release version of a map database and a point of interest database from a remote host at 1301, determining if the current release version is a release version on a navigation system at 1302, and receiving the current release version of the map database and the point of interest database if the current release version is not the release version on the navigation system at 1303.

The methods can be performed automatically on a predetermined time period. For example, the predetermined time period can be every week, every month, every six months, every year, and the like. The navigation system can comprise an in-vehicle navigation system.

Sending the current release version of the map database and the point of interest database to the navigation system can comprise transmitting data that changed between releases.

Requesting a current release version of a map database and a point of interest database from a remote host can comprise requesting over one or more of, a cellular network, an IP network, a satellite network.

Receiving the current release version of the map database and the point of interest database can comprise receiving over one or more of, a cellular network, an IP network, a satellite network.

Figure 14:
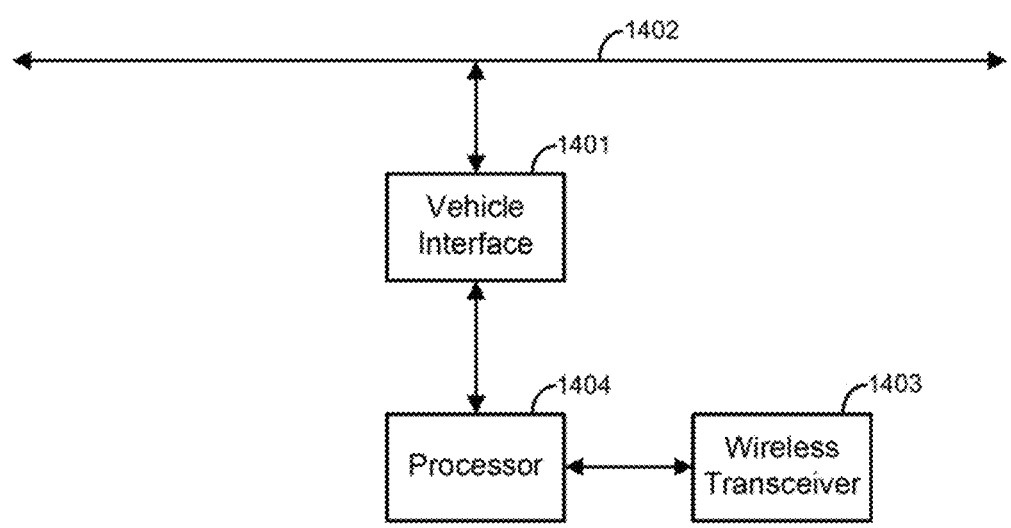
FIG. 14 is an exemplary apparatus.

In another aspect, illustrated in FIG. 14, provided is an apparatus for telematics navigation, comprising an optional vehicle interface 1401, coupled to a vehicle bus 1402, wherein the vehicle interlace 1401 is configured to receive data through the vehicle bus 1402, a wireless transceiver 1403, and a processor 1404, coupled to the vehicle interface 1401 and the wireless transceiver 1403, wherein the processor 1404 is wherein the processor is configured performing methods disclosed herein. The apparatus can further comprise a location determining unit, such as a GPS transceiver, coupled, to the processor 1404. The apparatus can further comprise an output device coupled to the processor 1404, configured for displaying a visual representation, of locations, destinations, routes, points of interest, maps, weather, traffic, combinations thereof, and the like. The wireless transceiver 1403 can be configured for transmitting data to a remote host, such as a central monitoring station and the like. The apparatus can be configured in various modalities for accomplishing the methods disclosed herein.

In one aspect, provided is an apparatus for telematics navigation, comprising a wireless transceiver, configured for receiving a desired route and a processor, coupled to the wireless transceiver, wherein the processor is configured for providing the desired route to a user.

In another aspect, provided is an apparatus for telematics navigation, comprising a wireless transceiver, configured for receiving a desired destination a location determining unit, configured for determining a user location, and a processor, coupled to the wireless transceiver and the location determining unit, wherein the processor is configured for determining a route from the user location to the desired location and providing the desired route to a user.

In a further aspect, provided is an apparatus for telematics navigation, comprising a location determining unit, configured for determining a user location, a wireless transceiver, configured for sending a request signal comprising the user location and a timestamp to a remote host and receiving a route, and a processor, coupled to the wireless transceiver and the location determining unit, wherein the processor is configured for providing the timestamp and the user location to the wireless transceiver and providing the desired route to a user.

In another aspect, provided is an apparatus for telematics navigation, comprising a wireless transceiver, configured for requesting and receiving a current release version of a map database and a point of interest database from a remote server and a processor, coupled to the wireless transceiver, wherein the processor is configured for initiating a request for the current release version, determining if the current release version is a release version on a navigation system, and receiving the current release version of the map database and the point of interest database if the current release version is not the release version on the navigation system.

Figure 15:
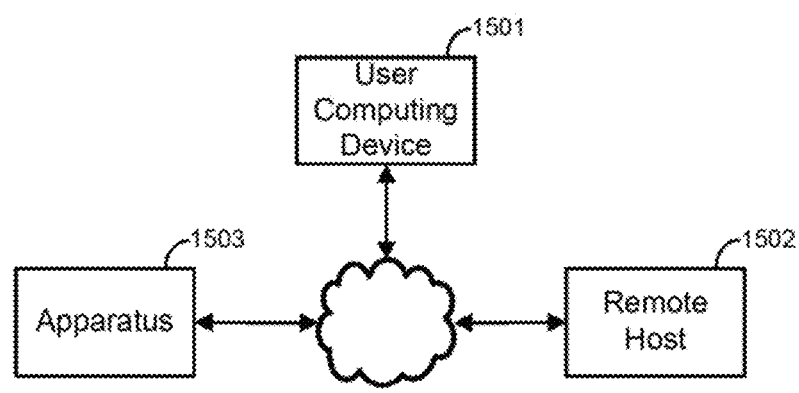
FIG. 15 is an exemplary system.

In another aspect, illustrated in FIG. 15, provided is a system for telematics navigation, comprising a user computing device 1501 configured for communicating with a remote host 1502, an apparatus 1503, configured for communicating with the remote host 1502. In certain embodiments, the apparatus 1503 can be a telematics device such as a vehicle telematics unit. In other embodiments, the apparatus 1503 can be a navigation system. In further embodiments, the apparatus 1503 can be a vehicle telematics unit and a navigation system. The user computing device 1501, the remote host 1502, and the apparatus 1503 can each be configured in various modalities for accomplishing the methods disclosed herein. The user computing device 1501 can be, for example, a pager, a cellular phone, a PDA, a laptop computer, a desktop computer, and the like. The user computing device 1501 can be configured for providing an interface to the user, such as a website, a text message entry screen, an email entry screen, and the like. The remote host 1502 can be a central monitoring station and the like. Communications between system components can be over a cellular network, an IP network, a satellite network and the like.

In one aspect, provided is a system for telematics navigation, comprising a user computing device, configured for providing an interface for a user to provide a user location and a desired destination and sending the desired destination to a remote host, a telematics device, configured for receiving a route, and a remote host, configured for receiving the desired destination, and the user location, determining a route from the user location to the desired location, and sending the route to the telematics device.

In another aspect, provided is a system for telematics navigation, comprising a user computing device, configured for providing an interface for a user to provide a desired destination and sending the desired destination to a remote host, a telematics device, configured for determining a user location, sending the user location to a remote host, and receiving a route, and a remote host, configured for receiving the desired destination and the user location, determining a route from, the user location to the desired location, and sending the route to the telematics device.

In an aspect, provided is a system for telematics navigation, comprising a user computing device, configured for providing an interface for a user to provide a desired destination and sending the desired destination, to a remote host, a telematics device, configured for receiving the desired destination, and a remote host, configured for receiving the desired destination and sending the desired destination to the telematics device.

In a further aspect, provided is a system for telematics navigation, comprising a user computing device, configured for providing an interface for a user to provide a starting location, a desired destination, and a time frame and sending the starting location, the desired destination, and the time frame to a remote host, a telematics device, configured for sending a request signal comprising a user location and a timestamp to a remote host and receiving a route, and a remote host, configured for receiving the starting location, the desired destination, and the time frame, determining a plurality of routes from the starting location to the desired destination, receiving the request signal from the telematics device, determining traffic conditions for the plurality of routes, resulting in a route with, a lowest estimated, time of arrival (ETA), and sending the route with the lowest ETA to the telematics device.

In another aspect, provided is a system for telematics navigation, comprising a navigation system, configured for determining a release version of a map database and a point of interest database and providing the release version to a remote host and a remote host, configured for requesting the release version of the map database and the point of interest database from the navigation system, determining if the requested release version is a current release version, and sending the current release version of the map database and the point of interest database to the navigation system if the requested release version is not the current release version.

While the methods, systems, and apparatuses have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A device comprising:
   a location determining unit configured to determine a current location,
      the current location being a starting location;
   a processor, coupled to a wireless transceiver and the location determining unit, configured to:
      provide a timestamp and the current location to the wireless transceiver,
         the timestamp being recorded at ignition of a vehicle that includes the device, and
      cause the wireless transceiver to transmit a request signal to a remote server,
         the request signal comprising information identifying the current location, the timestamp, and diagnostic information relating to the vehicle,
         the remote server determining a route, from one or more particular routes, based on the current location, the timestamp, and the diagnostic information,
         the route corresponding to a time frame that encompasses the timestamp; and
   the wireless transceiver configured to:
      send, to the remote server, the request signal, and
      receive the route from the remote server,
         the processor being further configured to receive the route from the wireless transceiver and provide the route to a user.

2. A system comprising:
   a remote server to:
      receive one or more routes corresponding to at least one of one or more time frames;
      receive a current location signal transmitted from a device in a vehicle,
         the current location signal including:
            information identifying a current location, of the vehicle, corresponding to at least one of the one or more routes,
            a timestamp recorded at ignition of the vehicle, and
            vehicle diagnostic information,
               the current location being a starting location;
      associate information, in the current location signal, with the at least one of the one or more routes and a corresponding time frame of the at least one of the one or more time frames; and
      determine a route having a shortest travel time out of one or more travel times of the one or more routes,
         the route being determined based on the current location, the vehicle diagnostic information, and a time associated with the timestamp,
         the route corresponding to a time frame that encompasses the time associated with the timestamp.

3. The system of claim 2, wherein, when determining the route, the remote server is to compare the vehicle diagnostic information with diagnostic information received from one or more vehicles at one or more times corresponding to the time frame that encompasses the time.

4. The system of claim 2, wherein the vehicle diagnostic information includes speed.

5. The system of claim 2, wherein the vehicle diagnostic information includes brake usage information.

6. The system of claim 2, wherein the vehicle diagnostic information includes acceleration information from an acceleration sensor.

7. The system of claim 2, wherein the device is a vehicle telematics device.

8. The system of claim 2, wherein the route is requested by a wireless mobile device.

9. A method comprising:
   receiving, at a remote server, one or more particular routes corresponding to at least one of one or more time frames;
   receiving, at the remote server and from a device in a vehicle, a current location signal,
      the current location signal including:
         information identifying a current location, of the vehicle, corresponding to at least one of the particular one or more routes,
         a timestamp recorded at ignition of the vehicle, and
         vehicle diagnostic information,
            the current location being a starting location;
   associating, by the remote server, information in the current location signal with the at least one of the one or more particular routes and a corresponding time frame of the at least one of the one or more time frames; and
   determining, at the remote server, route having a shortest travel time out of one or more travel times of the one or more particular routes,
      the route being determined based on the current location and a time associated with the timestamp,
      the route corresponding to a time frame that encompasses the time associated with the timestamp.

10. The method of claim 9, wherein determining the route includes comparing the vehicle diagnostic information, received from the device, with diagnostic information received from one or more devices at one or more times corresponding to the time frame that encompasses the time.

11. The method of claim 9, wherein the vehicle diagnostic information includes speed.

12. The method of claim 9, wherein the vehicle diagnostic information includes brake usage information.

13. The method of claim 9, wherein the vehicle diagnostic information includes acceleration information from an acceleration sensor.

14. The method of claim 9, wherein the route is requested by a user mobile device.

15. The method of claim 9, wherein the device is a vehicle telematics device.

16. The device of claim 1, wherein the vehicle is a vehicle telematics device.

17. The device of claim 1, wherein the diagnostic information includes speed.

18. The device of claim 1, wherein the diagnostic information includes brake usage information.

19. The device of claim 1, wherein the diagnostic information includes acceleration information from an acceleration sensor.

* * * * *